(12) United States Patent
Wiseman

(10) Patent No.: US 6,199,084 B1
(45) Date of Patent: Mar. 6, 2001

(54) METHODS AND APPARATUS FOR IMPLEMENTING WEIGHTED MEDIAN FILTERS

(75) Inventor: John Wiseman, Newtown, PA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/149,679

(22) Filed: Sep. 9, 1998

(51) Int. Cl.$^7$ ........................................ G06F 17/10
(52) U.S. Cl. .................................. 708/304; 382/262
(58) Field of Search ............................ 708/304, 202; 382/262

(56) References Cited

U.S. PATENT DOCUMENTS

| | | | | |
|---|---|---|---|---|
| 4,928,258 | * | 5/1990 | May ........................... | 708/304 |
| 5,144,568 | * | 9/1992 | Glover ....................... | 708/304 |
| 5,733,159 | * | 3/1998 | Jung ........................... | 382/262 |
| 6,018,750 | * | 1/2000 | Connell et al. .............. | 708/202 |
| 6,058,405 | * | 5/2000 | Kolte et al. ................. | 708/304 |
| 6,078,213 | * | 6/2000 | Huang ......................... | 708/304 |

\* cited by examiner

Primary Examiner—David H. Malzahn
(74) Attorney, Agent, or Firm—Straub & Pokotylo; Michael P. Straub

(57) ABSTRACT

Methods and apparatus for efficiently implementing weighted median filters are described. In a first hardware embodiment, the median filter is implemented using a number of storage locations which is equal to or greater than the sum of the weight values used to implement the filtering operation. In other embodiments, the number of storage locations required to store data values is reduced to equal or approximately equal the number of data values, used in the filtering operation. In such embodiments, the data values are sorted according to size and a filter weight is associated with each data value, e.g., as part of a data record created for each one of the data values. The data value to output, as the result of the filtering operation, is determined from the stored weight values. By storing the weight values in conjunction with the data values, the number of storage locations required to implement a median filter is rendered independent of the weight values allowing for large weights to be used without requiring the use of an equally large number of storage locations.

31 Claims, 12 Drawing Sheets

| DATA VALUE | 30 | 25 | 21 | 19 | 13 | 10 | 7 | 2 | 1 | |
|---|---|---|---|---|---|---|---|---|---|---|
| REGISTER # | 0 | 1 | 2 | 3 | 4 | 5 | 6 | 7 | 8 | 9 |

Fig. 10A

| DATA VALUE | 30 | 25 | 21 | 19 | 17 | 13 | 10 | 7 | 2 | 1 |
|---|---|---|---|---|---|---|---|---|---|---|
| REGISTER # | 0 | 1 | 2 | 3 | 4 | 5 | 6 | 7 | 8 | 9 |

Fig. 10B

| DATA VALUE | 30 | 25 | 21 | 17 | 13 | 10 | 7 | 2 | 1 | |
|---|---|---|---|---|---|---|---|---|---|---|
| REGISTER # | 0 | 1 | 2 | 3 | 4 | 5 | 6 | 7 | 8 | 9 |

Fig. 10C

| | | | | |
|---|---|---|---|---|
| RECORD 0 | Data (30) | Weight (1) | New | Age |
| RECORD 1 | Data (25) | Weight (3) | New | Age |
| RECORD 2 | Data (21) | Weight (1) | New | Age |
| RECORD 3 | Data (19) | Weight (3) | New | Age |
| RECORD 4 | Data (17) | Weight (5) | New | Age |
| RECORD 5 | Data (13) | Weight (3) | New | Age |
| RECORD 6 | Data (10) | Weight (1) | New | Age |
| RECORD 7 | Data (7) | Weight (3) | New | Age |
| RECORD 8 | Data (2) | Weight (1) | New | Age |

FIG. 11

METHODS AND APPARATUS FOR IMPLEMENTING WEIGHTED MEDIAN FILTERS

FIELD OF THE INVENTION

The present invention relates to digital filters, and more specifically, to methods and apparatus for efficiently implementing weighted median filters.

BACKGROUND OF THE INVENTION

Currently, images, speech, a wide variety of communications signals and numerous other types of information are being represented in the form of digital data.

Unfortunately, due to, e.g., transmission errors, signal interference, etc., digital signals and the sets of digital data represented thereby, often become corrupted by impulse noise. Impulse noise frequently introduces sharp, sudden changes in signal values. For transmitted signals, e.g., audio and/or video signals, this can result in undesired noticeable signal degradation.

In many applications the use of infinite impulse response (IIR) and finite impulse response (FIR) filters can reduce or eliminate some of the undesirable effects of impulse noise. Unfortunately, the use of such filters has undesirable consequences in many applications. for example, the use of FIR and IIR filters on images tends to have the undesirable effect of softening edges within an image and/or blurring images. This is because such filters operate on pixels affected by impulse noise as well as pixel values unaffected by impulse noise.

Median filters have the advantage of modifying a single value at a time, e.g., as a function of adjacent values in a set of digital data values. Median filters replace the value being processed with the median or middle value found in the set of values used to perform the filtering operation. The median value need not be, and in many cases will not be, the average value of the set of values used to perform the filtering operation.

FIG. 1, illustrates a 4×4 array of values, e.g., pixel values, where letters A through P each represent a different pixel value, e.g., a value used to represent pixel luminance or chrominance information.

Assume a 3×3 median filter were used to filter the pixel value F of FIG. 1. In such a case, the pixel value F would be replaced by the median value in the set of pixel values A, B, C, E, F, G, I, J, K.

Median filters will normally result in the replacement of pixel values which have been affected by impulse noise. However, when applied to images, they also have the undesirable effect of replacing many pixel values which are unaffected by impulse noise as well.

The use of a weighted median filter can reduce the risk that pixel values which are unaffected by impulse noise will be replaced as a result of a median filtering operation. FIG. 2 shows a weighting matrix that can be used to implement a weighted median filter. In a weighted median filter, the weight determines the number of times the corresponding value should be included in the set of values used to determine the median. For example, using the filter weights shown in FIG. 2 to perform a 3×3 weighted median filtering operation on the set of pixel values [A, B, C, E, F, G, I, J, K] would result in a set of 21 values, [A, B, B, B, C, E, E, E, F, F, F, F, F, G, G, G, I, J, J, J, K] the median of which would be used to replace the pixel value F which is being filtered.

Because the weighted median filtering operation allows the pixel value being filtered to be weighted more heavily than other values used in the filtering operation, the chance of the pixel value being changed can be controlled so that it is far less than that which occurs in an unweighted median filtering operation. Accordingly, weighted median filters are well suited for filtering impulse noise from images without excessive "softening" of the image that may occur when regular median filters are used.

When weights are used as part of a filtering operation, the weights can be either static, e.g., fixed at the time the filter is initially designed, or dynamic, whereby the filter weights may change with each filtering operation that is performed.

Numerous known techniques exist for dynamically generating filter weights. As will be discussed below, such known techniques may be used with various embodiments of the present invention.

Difficulties in providing enough storage locations to store the relatively large number of values used in a median filtering operation and the difficulty in implementing dedicated hardware capable of determining the median value to be output have lead to most median filtering operations, and weighted median filtering operations in particular, being implemented in software, e.g., using a general purpose computer.

Image processing, and video processing in particular, often involves the processing of large numbers of pixel values in real time, e.g., the time used to display the images being processed. The relatively slow nature of software implemented weighted median filtering operations is a major disadvantage when attempting to perform fast data processing such as real time image processing.

In view of the above, it becomes apparent that there is a need for new and improved methods of implementing weighted median filters and performing weighted median filtering operations. It is desirable that new weighted median filtering methods be relatively fast at processing data. It is also desirable that any hardware implementations be relatively efficient in the way they are implemented. It is also desirable that at least some hardware implementations be capable of supporting dynamic updating of weight values and use of large weight values without the need to provide large numbers of registers.

SUMMARY OF THE PRESENT INVENTION

As discussed above, the present invention is directed to methods and apparatus for implementing weighted median filters.

In accordance with a first embodiment of the present invention, a weighted median filter is implemented in hardware through the use a number of registers. In such an embodiment the filter apparatus comprises a number of registers equaling the sum of the weights used by the weighted median filter being implemented.

In accordance with a second embodiment of the present invention, the number of registers required to implement a median filter in hardware is greatly reduced to the point where the number of utilized registers can equal or approximately equal the number of data values used to perform the filtering operation. In such an embodiment, the required number of registers is independent of the value of the weights used.

In the second embodiment of the present invention, each data value is stored with an associated weight to be used to perform the median filtering operation. The data and associated weight values are stored, e.g., in memory locations or hardware registers. The contents of the registers are arranged, e.g., in ascending or descending order, according to the data values being used to perform the median filtering operation.

Once sorted, the output of the median filtering operation is determined by sequentially examining the weights associated with the sorted and stored data values.

In one particular embodiment, a median filter output control value (OCV) used in selecting the storage location, from a series of storage locations used to store data and weight values, which contains the data value to be output. The OCV is generated by summing the weights being used to perform the filtering operation and dividing by two. If the resulting value is a non-integer value it may be rounded up or down, as desired, to the nearest integer value so that fractional values need not be used.

In particular embodiment, the data values are sorted in descending order and stored in order in a series of storage devices along with their associated weight values. To determine which data value to output, the weight associated with the data value stored in the first storage device, i.e., the largest data value, is examined and compared to the OCV. If the weight value equals or exceeds the OCV the data value stored in the first storage device is output as the result of the median filtering operation. In the event that the output conditions are not satisfied the first weight is added to the weight associated with the data value stored in the next storage device to create a total weight (TW) value. If the TW value equals or exceeds the OCV then the data value stored in the second storage device is output as the result of the median filtering operation. The TW value is repeatedly incremented using the weight associated with each the data value stored in each subsequent storage device in the series of storage devices, one at a time. Each time the TW value is incremented, it is compared to the OCV value. When the TW value equals or exceeds the TW value, the output of the median filter is determined to be the data value associated with the filter weight which caused the output criterion to be satisfied.

In addition to storing weight and data values, as will be discussed below, age indicator bits may be associated with stored data values to indicate which values should be replaced when a series of mean filtering operations are being performed using overlapping data sets. Through the use of the age indicator, the need to completely reload a series of registers with a full set of data values to be used in a filtering operation can be avoided by allowing for the identification of previously loaded data values which will be used in one or more subsequent data filtering operation.

In addition to the age indicator, a new bit may be used to indicate which values have been recently added to the series of storage devices which are used to store the data values. In one embodiment, new data values which are added to the set of storage devices are assigned the proper weights at or prior to storage and therefore need not have their weights updated. The new bit allows for the easy identification of old data values which need to have their weights updated, e.g., due to a change in their position within the filter matrix.

Various techniques may be used in accordance with the present invention for selecting, as a function of stored weight values associated with sorted data values, which data value is to be output. For example, rather than summing the weights and comparing them to an OCV, the weights may be sequentially subtracted from a preselected value, e.g., the sum of the total weight values used to implement the weighted median filter, and then compared to an OCV to determine which value to output.

The weighted median filtering methods and apparatus of the present invention can be used in a wide variety of filtering applications including for example, image processing, speech processing and statistical analysis applications to give but a few examples.

Numerous additional features and embodiments of the present invention are discussed in detail in the description which follows.

BRIEF DESCRIPTION OF THE DRAWINGS

FIGS. 10A–10C illustrate the insertion of a data value into a set of registers used to perform a weighted median filtering operation in accordance with the present.

FIG. 11 illustrates the contents of a register array during a weighted median filtering operation.

DETAILED DESCRIPTION

As discussed above, the present invention is directed to methods and apparatus for implementing weighted median filters.

In the case of image processing and many other weighted median filtering operations, values to be filtered in a two dimensional array are processed in the order of top left to bottom right. Such processing frequently results in the use of a few new data values and several old data values being used during each filtering operation. Data values which are used in two filtering operations, e.g., sequential filtering operations, may be thought of as overlapping data values.

Figure 1A:
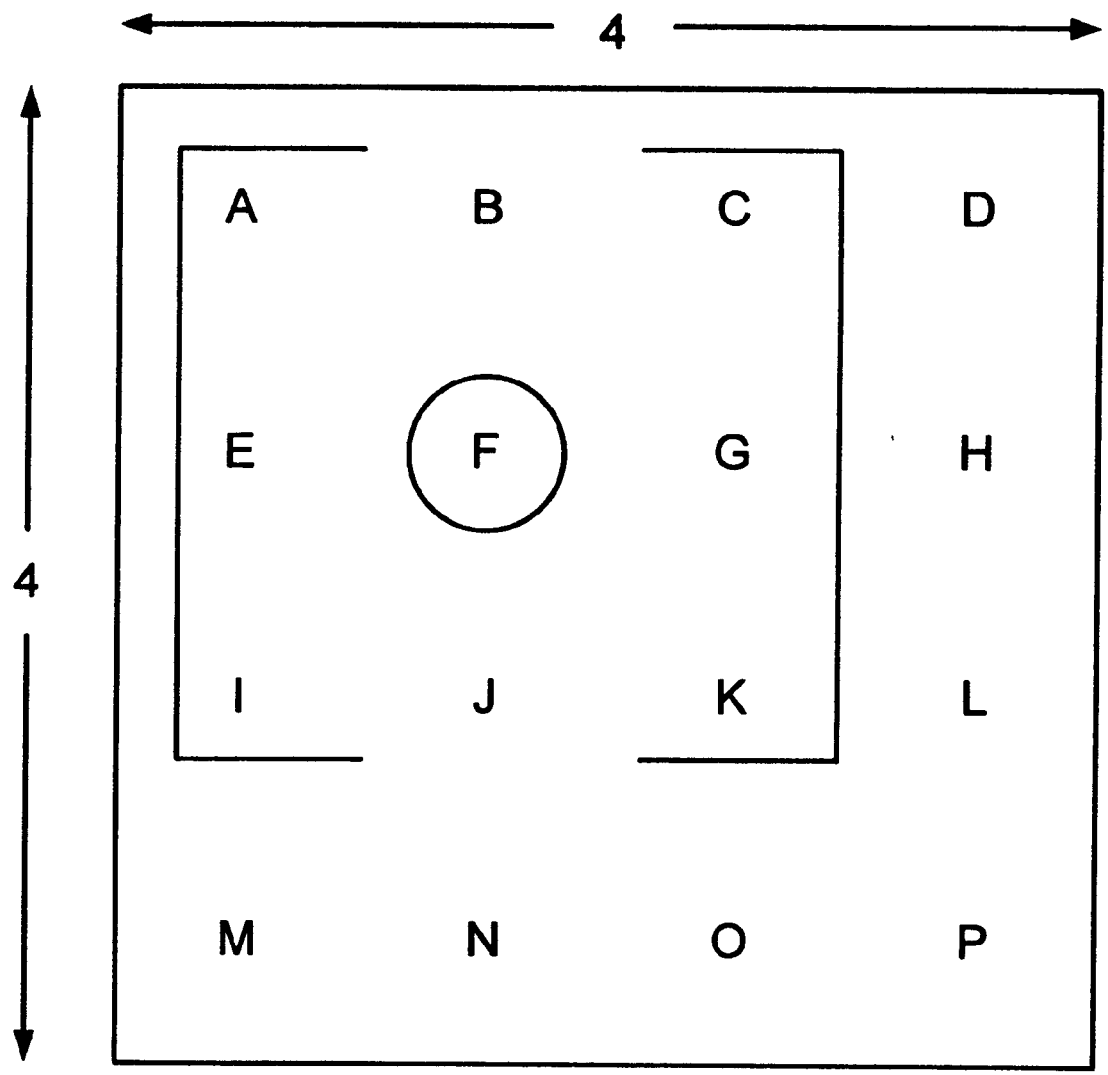
FIG. 1A illustrates a series of values corresponding to a 4×4 array of pixel values including a first set of 9 values which is to be used in a 3×3 weighted median filtering operation.
Figure 1B:
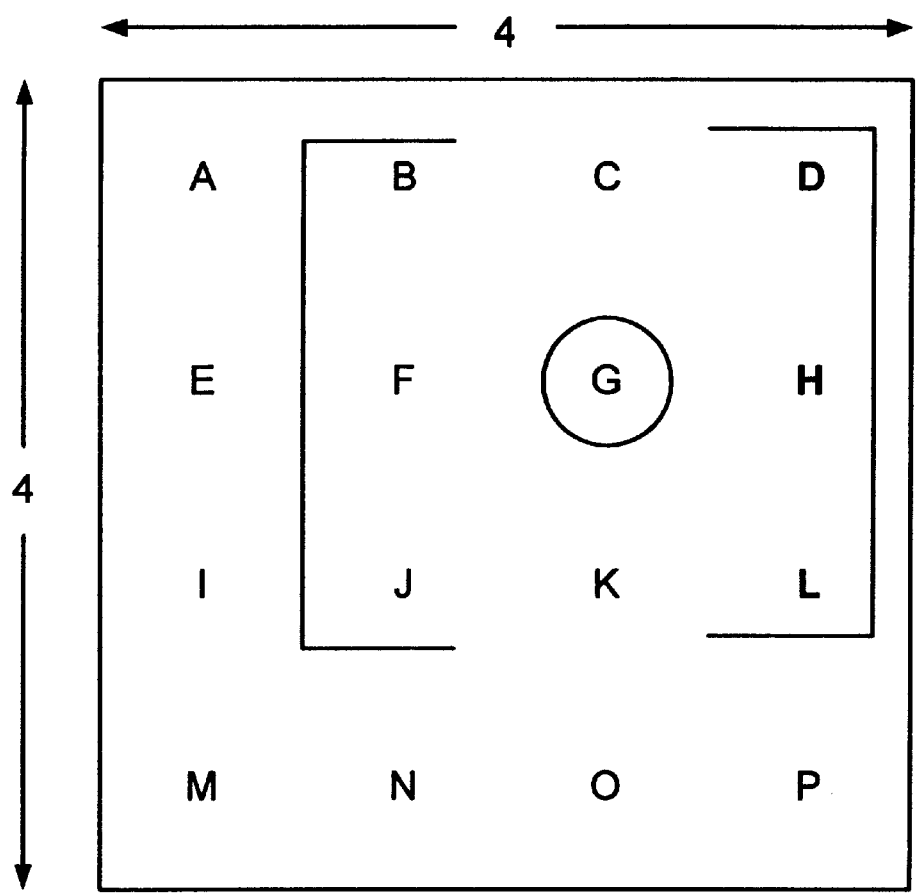
FIG. 1B illustrates the same series of values illustrated in FIG. 1 with a second set of 9 values being selected for use in a 3×3 weighted median filtering operation.

Consider for example FIGS. 1A and 1B. FIG. 1A illustrates a 4×4 array of values. The nine values included in the brackets are used when performing a 3×3 weighted median filtering operation on the value F, e.g., using the weighting matrix of FIG. 2.

FIG. 1B illustrates the same 4×4 array of values shown in FIG. 1A. Note however that FIG. 1B illustrates a 3×3 weighted filtering operation being performed on the next element in the 4×4 array, G. Note that in such a filtering case, there are 6 old values used during the second filtering operation and 3 new values, e.g., D, H, L. The 6 old values are overlapping data values since they are used in 2 sequential processing operations. As will be discussed in detail below, the concept of overlapping or "old" values is used in various embodiments of the present invention to allow for weighted median filtering operations to be performed without having to reload all the data values used to perform each filtering operation as a series of sequential weighted median filtering operations are performed.

Figure 3:
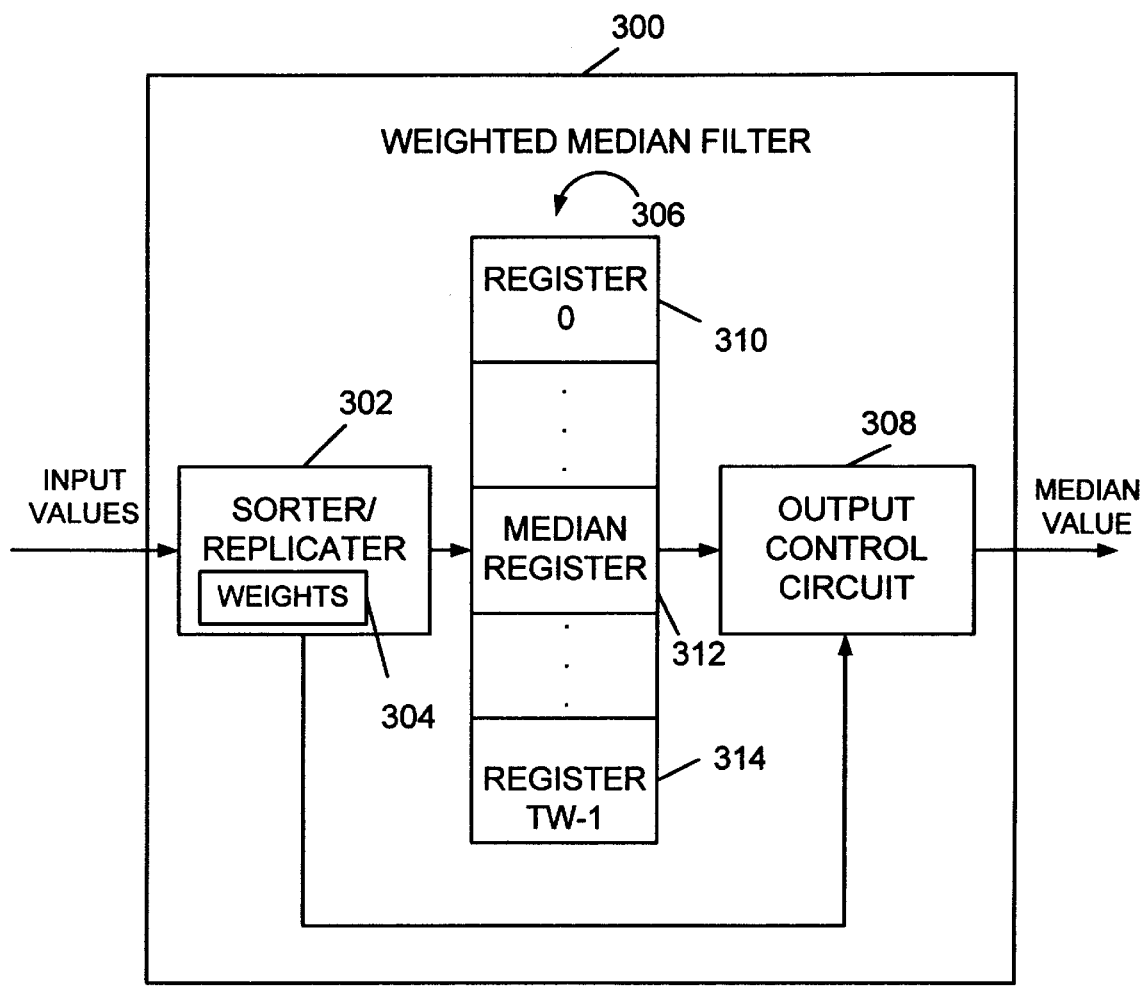
FIG. 3 illustrates a hardware circuit for implementing a weighted median filtering operation in accordance with a first embodiment of the present invention.

FIG. 3 illustrates a weighted median filter implemented as a hardware circuit in accordance with a first embodiment of the present invention. The weighted median filter 300 comprises a sorter/replicater 302, an array of TW registers 306, where TW is the sum (total) of the weights used in the filter, and an output control circuit 308.

The values to be used in performing the weighted filtering operation are input to the sorter/replicater 302. Stored within the sorter/replicater 302 is the weighting matrix information 304. As each value is read in, the corresponding weight is determined from the weighting matrix information 304 and the data value is replicated the number of times indicated by the corresponding weight. As each data value is generated by the replication process, it is stored in the register array 306. The sorter/replicater 302 is responsible for sorting the data values as they are inserted into the register array 306 so that they are stored in descending order. If desired, they may, alternatively, be sorted in ascending order.

Once the TW data values generated by the sorter/replicater 302 have been stored in the register array 306, the median value to be output will be stored in middle or median register 312 which is positioned at the center of the register array 306. In the case of TW being odd, the median register will be register (TW−1)/2 assuming the registers are numbered 0 to TW−1. In the case of an even number of replicated data values resulting from TW being an even number, the median register 312 may be selected as either the (TW/2) or ((TW/2)−1) register and will normally be fixed for the particular implementation.

The output control circuit is responsive to a signal from the sorter/replicater 302 indicating that the values to be used for a filtering operation have all been stored in the register array 306. In response to the signal from the circuit 302, the output control circuit 308 causes the value stored in the median register 312 to be output as the output of the weighted median filter 300 given the received set of input values.

The filter 300 offers a functional hardware circuit suitable for implementing a weighted median filter. However, because the number of registers required to implement the weighted median filter 300 is proportional to the sum of the filter weights used, it becomes difficult from a hardware perspective to implement the filter circuit 300 when large weights are used. In addition, in a dynamic weight updating situation, the number of registers included in the register array 306 places constraints on the value of the filter weights that may be used during any particular filtering operation.

Figure 4A:
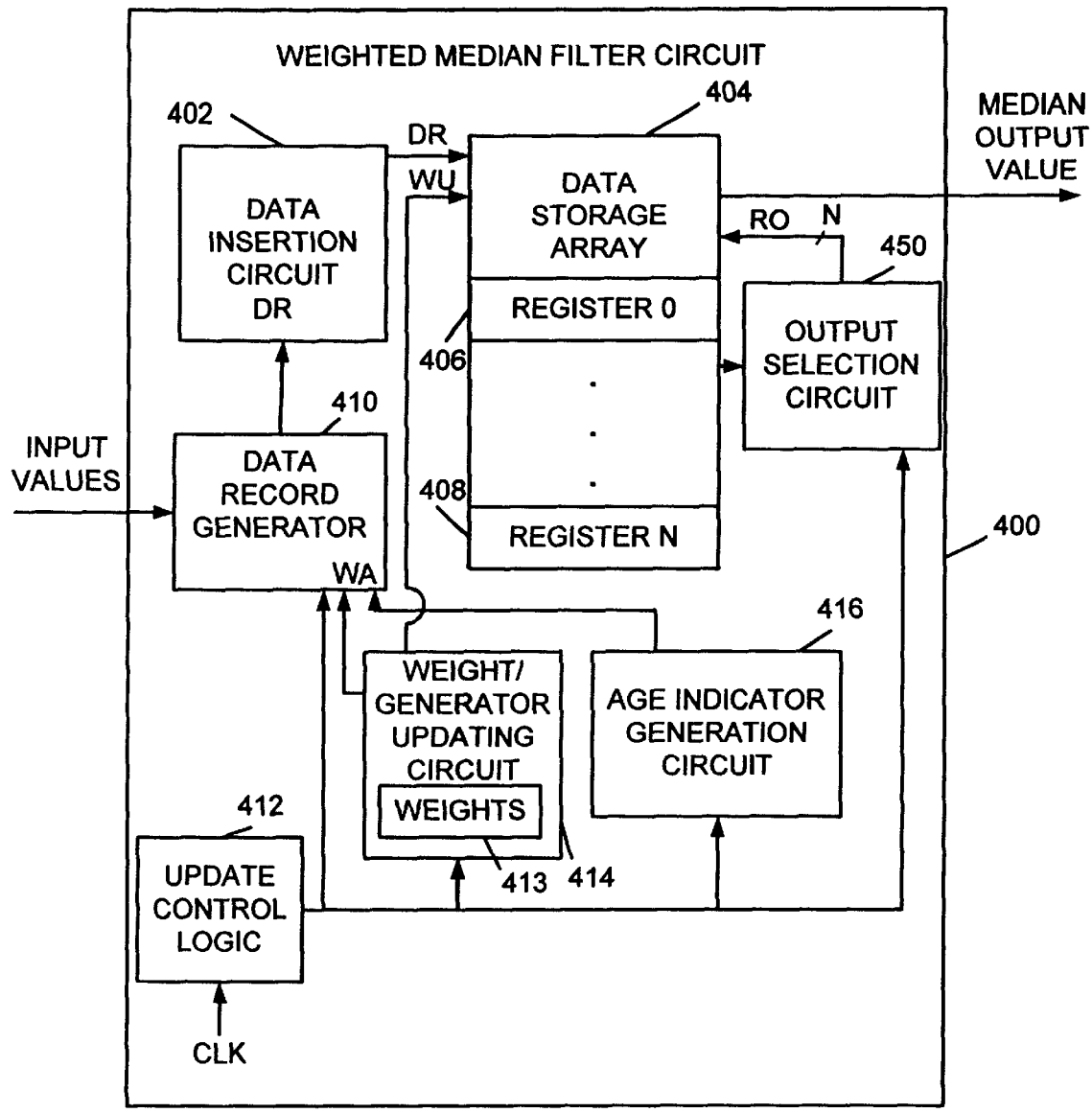
FIG. 4A illustrates a hardware circuit for implementing a weighted median filter circuit in accordance with another embodiment of the present invention.

FIG. 4A illustrates a weighted median filter circuit 400 implemented in accordance with a second embodiment of the present invention. As illustrated, the filter circuit 400 comprises a data record generator 410, a data insertion circuit 402, data storage array 404, an update control logic circuit 412, a weight generator/updating circuit 414, an age indicator generation circuit 416 and an output selection circuit 418.

The update control logic 412 is used to control and synchronize the reading in of data values, the generation of weight and age values, the updating of records already loaded into the data storage array and the output of the median value generated by the filter circuit 400. It does this by supplying control signals to the various circuits 410, 413, 416, 418 coupled to the update control logic 412.

The data record generator 410 is responsible for receiving data values to be used in a filtering operation and generating one data record for each of the input values. In addition to receiving the input values, for each input value, the data record generator 410 receives a weight signal W from the weight generator/updating circuit 414 and an age indicator value A from the age indicator generation circuit 416. As the data record generator generates a data record using the received data, weight, and age values, it also generates a new indicator signal, e.g., by asserting a preselected bit in the data record being created.

Figure 5:
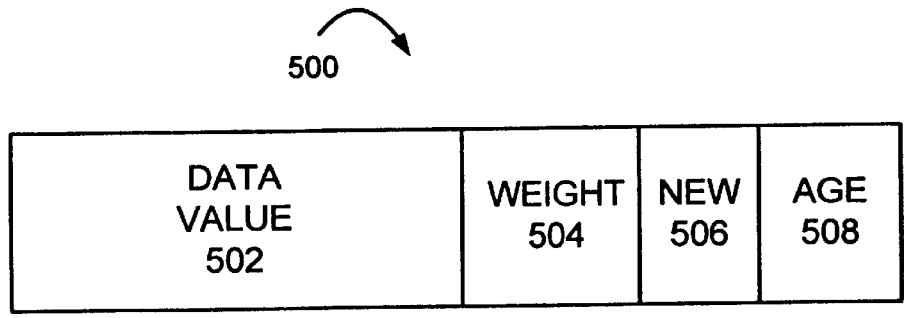
FIG. 5 illustrates a data record generated in accordance with the present invention as part of a weighted median filtering operation.

FIG. 5 illustrates the format of a data record 500 generated in one exemplary embodiment, by the data record generator 419. The data record 500 includes the input data value 502. Associated with the data value 502 is a weight 504, a new indicator bit 506, and an age indicator 508. The size of the various fields 502, 504, 506 and 508 may vary depending on the implementation. The data value field 502 should be sufficiently wide enough to accommodate the largest data value that may be encountered in the filtering operation. The weight field 504 should be sufficiently large that it can store the large weight to be used. The new field 506 is an optional field which is utilized in some embodiments. The new field is normally implemented using a single bit since a single bit is sufficient to indicate whether the data record is new or old. The age indicator field should be sufficiently large so that a distinct age value can be used for each set of values which is read in at a different time. For example, in the case of a 3×3 matrix where a new column of 3 values is read in during each filtering operation, at least 3 distinct age values need to be supported.

The age indicator generator circuit 416 may be implemented as a wrap around counter which supplies an incremented value each time a new set of data values is read in. The age indicator values will wrap around to 0 each time the counter reaches its limit and increment from there.

The data insertion circuit 402 receives the data records DR generated by the data record generator 410 and is responsible for inserting them into the data storage array according to the data value included in each record. Operation of the data insertion circuit 402 will be discussed in greater detail below.

The data storage array 404 includes a plurality of N+1 registers, register O 406 through register N 408 which are used for storing the data records generated by the circuit 410. In the illustrated embodiment, the data storage array 404 includes one more register than is required to store the N data values used to perform the filtering operation. For example, if a 3×3 weighted median filtering operation is being implemented, the data storage array would include a total of (3×3)+1 or 10 registers. As another example, if a 4×4 weighted median filtering operation was being implemented a total of (4×4)+1 or 17 registers would be used. The additional register is used to facilitate insertion of data records by the data insertion circuit 402 in the exemplary embodiment. However, the data storage array 404 could be implemented with the same number (N) of registers as data elements used to perform the filtering operation.

The output selection circuit 418 receives as its input the weight values stored in each of the (N) registers 0 through N−1. In response to a control signal from the update control logic circuit 412, the output selection circuit 450 generates, as a function of the received weight values, an output signal RO which indicates the register which includes the data value to be output. The output signal RO is supplied to the data storage array 404 and is used to control the output of the weighted median filter circuit 400.

Figure 4B:
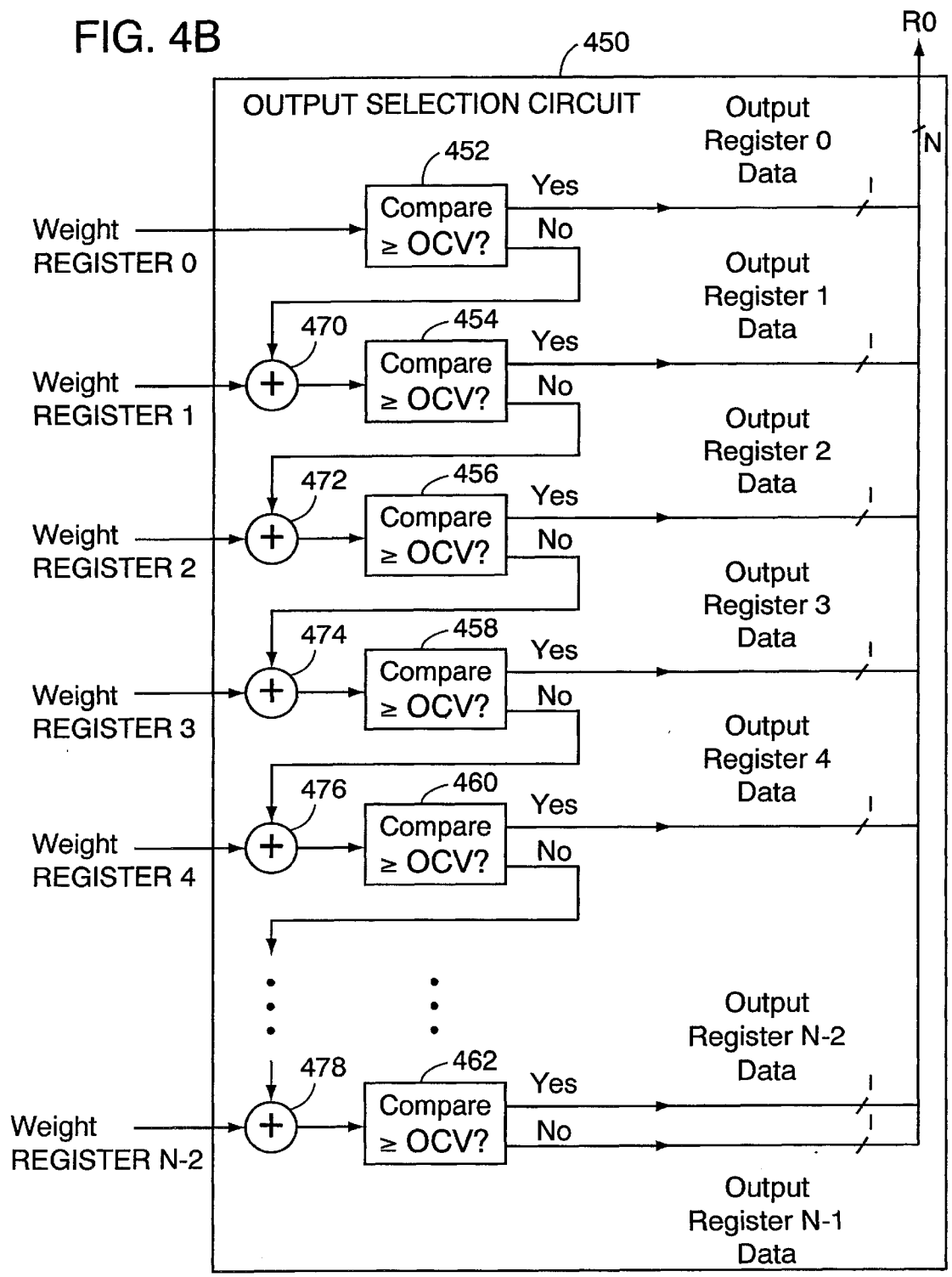
FIG. 4B illustrates an output selection circuit suitable for use as the output selection circuit of the weighted median filter illustrated in FIG. 4A.

FIG. 4B illustrates the output selection circuit 450 in greater detail. As illustrated, the output selection circuit 450 comprises a plurality of first through N−1 comparators 452, 454, 456, 458, 460, 462 and a plurality of summers 470, 472, 474, 476, 478 coupled together as illustrated in FIG. 4B. Each one of the (N−1) comparators corresponds to one of the registers. the comparators used to determine which register stores the data value which should be output.

Each comparator receives as an input, a weight value which is compared to the output control value (OCV). Beginning with the first comparator 452 and ending with the last comparator 462, the first comparator to have its output condition satisfied determines which register of the data storage array 404 stores the data value to be output as the result of the median filtering operation. If the weight value input to a comparator equals or exceeds the OCV, the comparator asserts a signal on its register output line indicating the register corresponding to the comparator contains the value to be output. If the weight value input to the comparator does not equal or exceed the OCV, it outputs the input weight value to the summer associated with the next comparator in the sequence of comparators.

Each summer 470, 472, 474, 476 and 478 receives as its input, the output weight value from the previous comparator and the weight value stored in the register with which it is associated. It sums the input values and generates the weight value, e.g., a total weight value TW, which serves as the input to the comparator having its input coupled to the summer generating the value TW.

After the first comparator 452, each subsequent comparator receives as its weight input, the sum of all the weights previously compared to the OCV and the weight stored in the register corresponding to the particular comparator performing the output test at any given time. For example, the second comparator 454 receives as its input a weight value equal to the sum of the weight included in the first register, register 0, and the second register, register 1.

The comparator outputs form an N bit bus which is coupled to the data storage array 404. The signal on the N bit bus represents the register output signal RO which is used to control which register is used to output the value resulting from the filter operation. In the illustrated embodiment, each line of the N bit bus is coupled to the register to which the line corresponds. Assertion of the signal on the individual line causes the corresponding register in the data storage array 404 to output its data value as the median output value.

Figure 6:
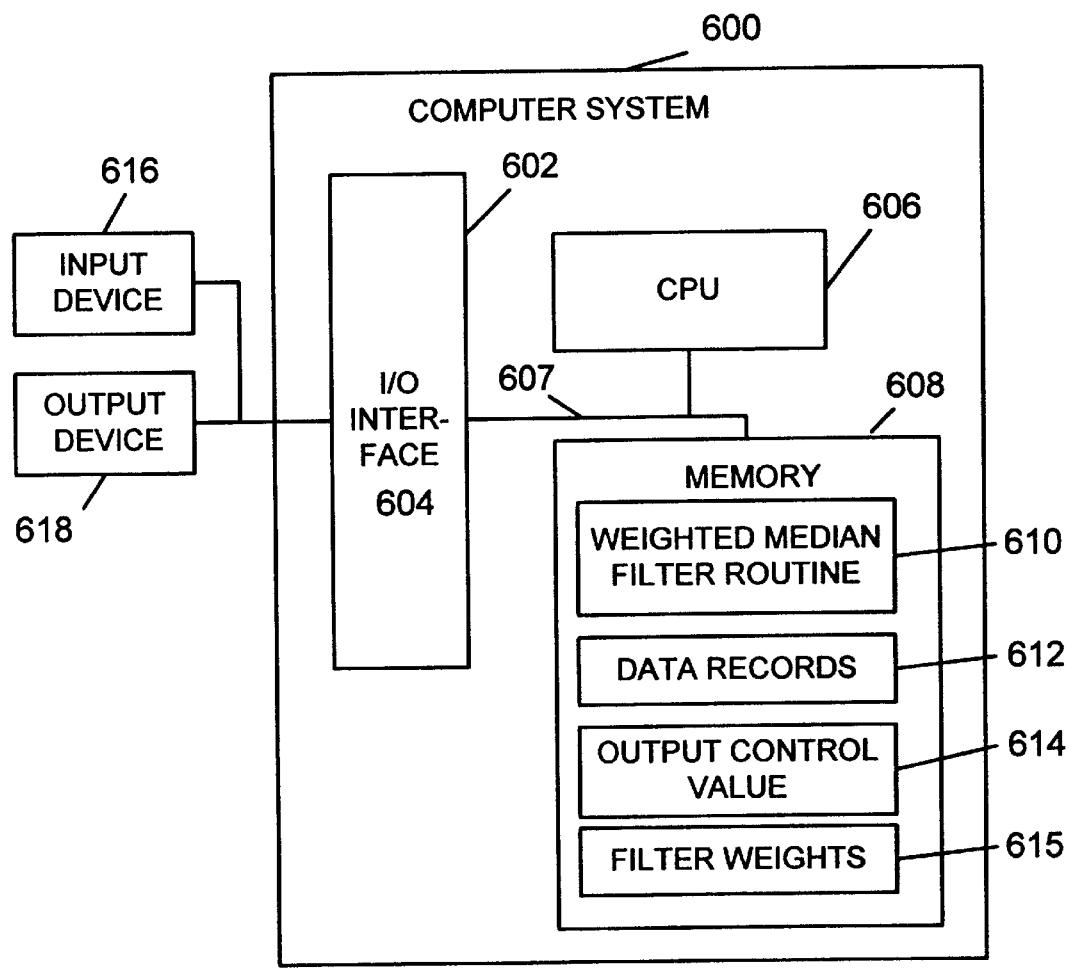
FIG. 6 illustrates a computer system implemented in accordance with the present invention capable of performing weighted median filtering operation using the filtering method of the present invention.

Hardware implementations of the methods and apparatus of the present invention have been described above. However, the weighted median filtering methods of the present invention are also well suited for implementation as computer programs, e.g., weighted median filter routines executed on computer systems such as the computer system 600 illustrated in FIG. 6.

The computer system 600 comprises an input/output (I/O) interface 604, a CPU 606, a memory 608 and a bus 607. The I/O interface 604 couples an input device 616 and an output device 618 to the computer system and electrically interfaces between the input and output devices 616, 618 and the various computer system components coupled to the I/O interface 604. The input device 616 may be, e.g., a digital video source such as a digital television receiver. The output device 616 may be, e.g., a display device such as a monitor capable of displaying images.

Within the computer system 600, a bus 607 is used to couple the CPU 606, memory 608 and I/O interface 604 together. The memory 608 includes a weighted median filter routine 610, data records 612 which are created and used as part of a filtering operation, an output control value 614, and filter weight information 615. The output control value 614 is a fixed value in the case of the use of static weights. However, in the case where the filter weights are dynamically modified between filter operations, the output control value 614 is modified whenever the total sum of the values of the weights used changes. The filter weight information 615 includes the weights to be used and information on their position within the utilized filter matrix be used.

Figure 7:
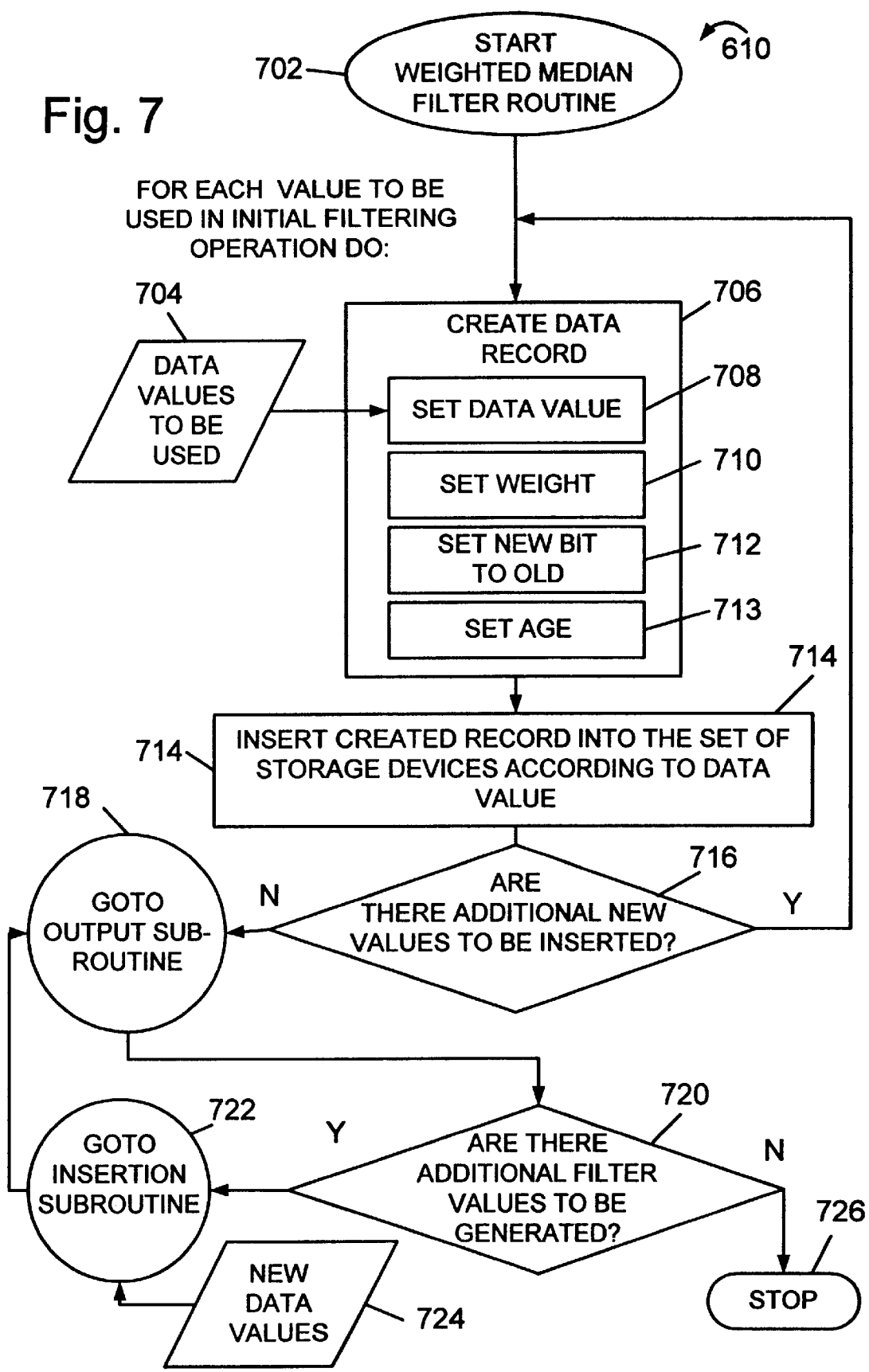
FIG. 7 illustrates a weighted median filtering routine implemented in accordance with an exemplary embodiment of the present invention.

A weighted median filter routine 610 implemented in accordance with the present invention is illustrated in FIG. 7. The routine 610 may be stored in the memory 608 and serve as the routine 610. The routine 610 may be executed by the CPU 606 of the computer system 600.

The weighted median filter routine 610 begins with the start step 702 wherein the instructions comprising at least a portion of the routine are loaded into, and executed by, the CPU 606. Steps 706, 714 and 716 are performed for each value to be used in an initial filtering operation. In the case of a 3×3 weighting matrix, these steps would be performed, e.g., 9 times creating a total of 9 data records to be used during a first filtering operation.

In step 706, a data value 704 to be used in the filtering operation is received and processed to create a data record. The creation of the data record, e.g., of the type illustrated in FIG. 5, involves several steps, i.e., steps 708, 710, 712, 713. Notably, these steps 708, 710, 712 and 713 may be performed in parallel or in any order desired. In step 708, the data value in the record is set to the input data value. In the next step 710, the weight to be used with the data value included in the record being created is determined and set, e.g., using the weighting matrix information 615. In step 712, the new bit is set to indicate that the data is "old". This avoids the need to de-assert the new bit prior to the next filtering operation.

In step 713, the age indicator bit of the record being created is set. The setting of the age indicator is a function of how the records are to be replaced during subsequent filtering operations. For example, in the case where each subsequent filtering operation results in a single column of data being input to replace an existing set of column values, each set of column data values used to create the data records would be assigned a different age value. The data records corresponding to the set of data values to be replaced first, e.g., in the next filtering operation, would be assigned the lowest age value, with the data records to be replaced last being assigned the highest age value. In the case where a 3×3 filter matrix is used, this would result in three sets of data records, comprising 3 records each, each set of records having a different age value assigned to the records included therein.

Once a data record is created in step 706, operation proceeds to step 714, wherein the created data record is inserted into the set of storage devices according to the data value, e.g., in the order of records having the highest data value being stored in the lowest numbered memory locations or registers proceeding to the record with the lowest data value being stored in the highest numbered memory location or register.

In step 716, a determination is made as to whether or not there are additional values which must be inserted into registers or stored in memory prior to being able to perform the filtering operation. If in step 716 it is determined that one or more additional data records need to be inserted, operation proceeds once again to step 706. However, if in step 716 it is determined that no additional values need to be inserted into the record array for the filtering operation to be performed operation proceeds to step 718.

Step 718 is a call to an output subroutine which is responsible for selecting and outputting the result of the median filtering operation. The output subroutine of the present invention will be discussed in greater detail below with reference to FIGS. 8A and 8B.

Once the output subroutine has completed its job of selecting and outputting the result of the particular median filtering operation being performed, operation proceeds to step 720. In step 720, a determination is made as to whether or not there are additional filter values to be generated, e.g., if there are additional pixel values of an image which still need to be processed.

If in step 720, it is determined that there are not additional filter values to be generated, operation proceeds to stop step 726 wherein the weighted median filter routine 700 terminates its operation. However, if in step 720 it is determined that additional filtering is to be performed on different values, operation proceeds to step 722 wherein a call to an insertion subroutine 722 is made. New data values 724 to be used in the filter operation are supplied to the called insertion subroutine 722. It is the insertion subroutine's responsibility to generate records for each of the new values to be used in the median filtering operation being performed. It is also the insertion subroutine's responsibility to insert the generated records into the array of records in the proper order according to the data values included therein and to remove from the data array old values which will not be used during the current filtering operation.

Once the insertion routine has completed its tasks operation proceeds once again to step 718 wherein the output generation subroutine is called and the output value of the median filter generated.

Depending on the number of values to be filtered, several iterations through steps 722 and 718 may occur via step 720 until it is determined in step 720 that the median filter has completed processing all the values to be filtered and the filter routine terminates in step 726.

Figure 8A:
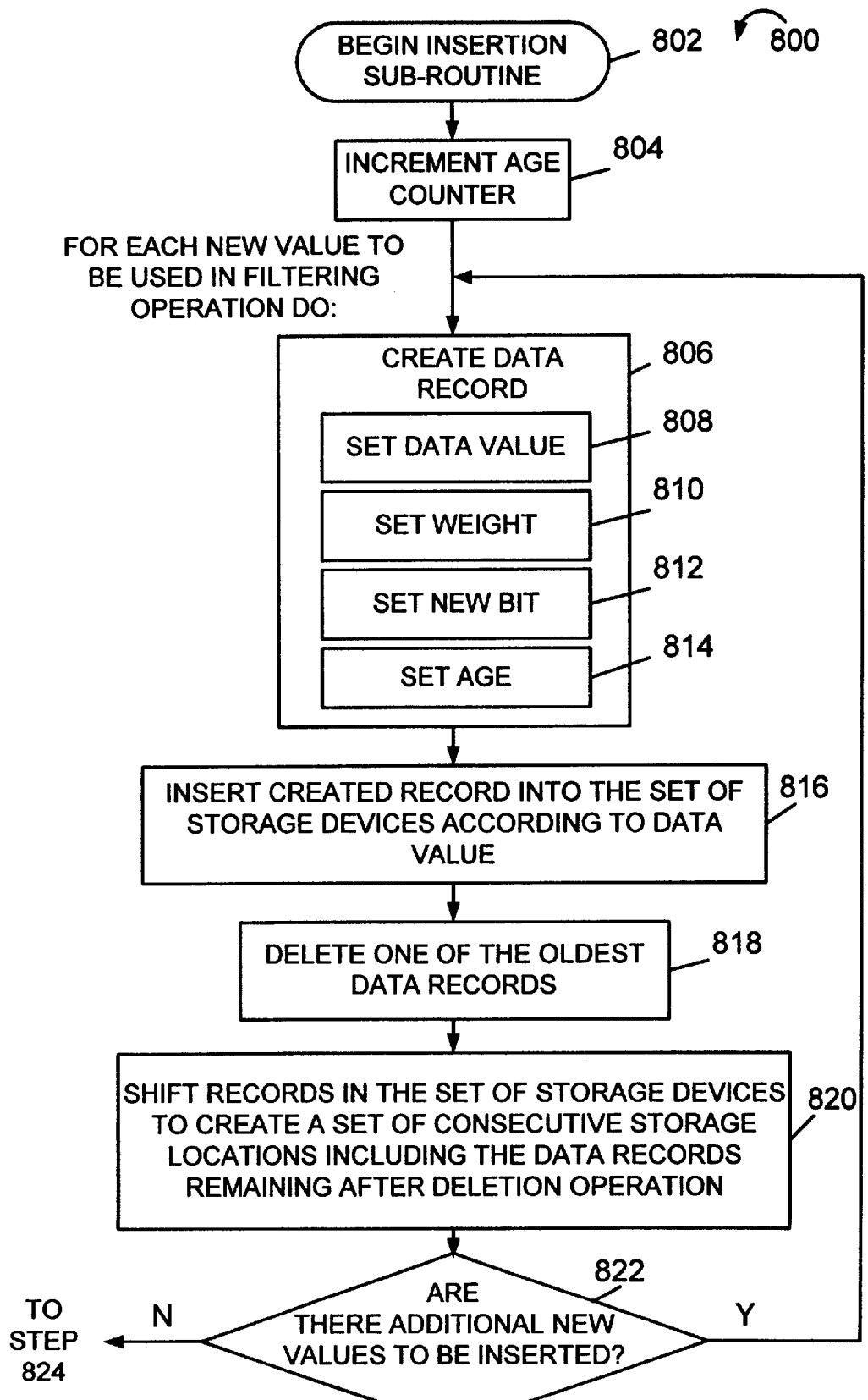
FIGS. 8A and 8B illustrate a data insertion sub-routine implemented in accordance with the present invention.
Figure 8B:
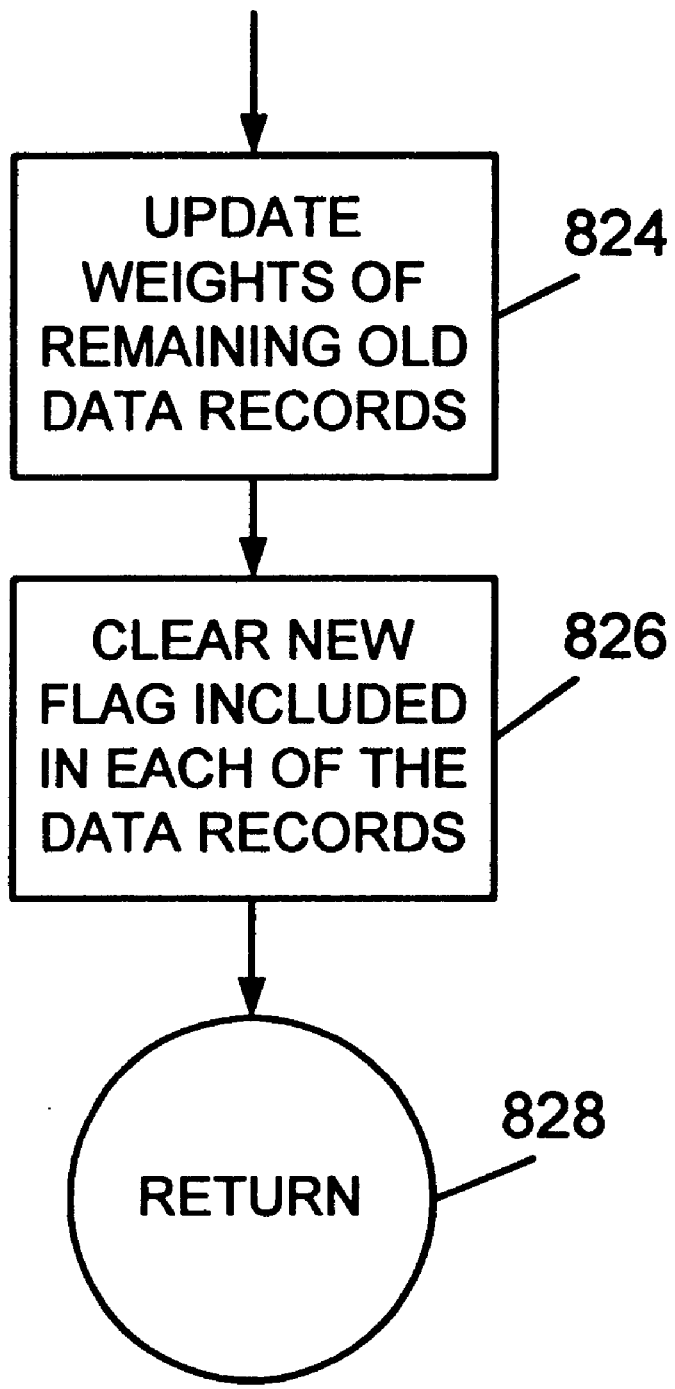

FIG. 8, which comprises the combination of FIGS. 8A and 8B, illustrates an insertion-subroutine 800 of the present invention.

The insertion subroutine 800 starts in step 802, wherein it is executed by the CPU 606. It proceeds from step 802, to step 804 wherein an age counter is incremented. The value of the incremented age counter is used in subsequent steps when generating data records for each of the new data values to be used in the current filtering operation.

Once the age counter has been incremented, for each new value to be used in the filtering operation steps 806, 816, 818 and 820 are preformed. In step 806, a data record for the data value to be used is created. Step 806 includes a series of sub-steps which involve setting, in the record being created, the data value, weight, new bit, and age values. The data value is set in sub-step 808 to an input data value. In sub-step 810, the weight is set, as a function of the weighting matrix being used, according to the input data values position within the set of data values being used to perform the filtering operation. In sub-step 812 the new bit is asserted indicating that a new data value is included in the record being created. In addition, in sub-step 814, the age is set to the value specified by the age counter which was incremented in step 804.

Once a data record is created, in step 816, it is inserted according to the data value included therein, into the set of storage devices, e.g., register or memory array, being used to store the data records for the filtering operation. One of the oldest data records in the set of storage devices is then deleted in step 818. Next, in step 820, the records in the set of storage devices is shifted so that the records remaining after the deletion operation are arranged in consecutive storage locations. Note that steps 818 and 820 are shown as separate steps for purposes of explaining the invention. However, the deletion operation of step 818 may be performed as part of the shifting operation performed in step 820 which results in the data record to be eliminated being overwritten.

Referring now briefly to FIGS. 10A–10C, the results of exemplary data record insertion, deletion and shifting operations performed in steps 816, 818, 820, respectively, are illustrated. In FIGS. 10A–l0C each box represents a data record which includes the data value shown in the box. The number under the box indicates the register in which the record represented by the box is stored.

The FIG. 10 example assumes that a new data record including the data value of 17 is to be inserted and that the record 10 has an age value indicating that it is the oldest record stored in the array of registers 0–9. The example also assumes use of a 3×3 weighting matrix and the storage of records in a total of 10 registers, registers 0 through 9, in descending order according to the data values included therein. The tenth register, register 9, is used as an overflow register to facilitate the insertion and sorting operation.

FIG. 10A illustrates the status of the array of registers 0–9 prior to insertion of a data record including the value 17. Note that register 9, the overflow register is blank indicating that the value is a "don't care" value at the start of the insertion step 816.

FIG. 10B illustrates the insertion of data record including the value 17 into the array of registers in accordance with step 816. Note that the new data record has been inserted into register 4. This is because the data value 17 is less than the data value 19 stored in register 3 but greater than the data value 13 originally stored in register 4. Note also that the contents of registers 4, 5, 6, 7, and 8 have been shifted once to the right resulting in register 9 having the data value 1 stored therein.

FIG. 10C illustrates the deletion of the data record 10, the oldest data record, from the array of registers 0–9 by shifting the contents of registers 7, 8 and 9 one register to the left resulting in the deletion of the data record including the data value 10. Thus, FIG. 10C illustrates the result of performing steps 818 and 820 of the insertion operation to complete the insertion of the record including data value 17.

Referring once again to FIG. 8A, after the insertion of a data record into the array of records and deletion of an old record, in step 822 a determination is made as to whether or not there are additional new values to be inserted. If there are, operation proceeds from step 822 to step 806.

However, in step 822 if it is determined that there are no additional new data values to be inserted, operation proceeds to step 824. In step 824 the weights of the data records in the register array which are indicated as being old, e.g., the records that do not have their "new" bit set, are updated. this involves changing the old records' weight values to reflect the data value's change in position within the set of data values being used to perform the filter operation relative to the weighting matrix. One or more known techniques may be used for dynamically selecting the values of a weighting matrix.

Because the utilized weights are updated between each filter operation in accordance with the present invention, the filter method is well suited for use with a dynamic or static weighting matrix. In the case of a dynamic weighting matrix, the weight values are updated with the weight values included in the dynamically modified weighting matrix as opposed to weights found in a static matrix.

Once the weights associated with each of the "old" data records is updated, the new flag in the data records is cleared. The clearing of the new flag occurs in step 826 resulting in all of the records having their flag values set to "old". Once this is done, the insert sub-routine returns to the point it was called from the main routine which causes operation to proceed to the output subroutine in accordance with step 718.

Figure 9:
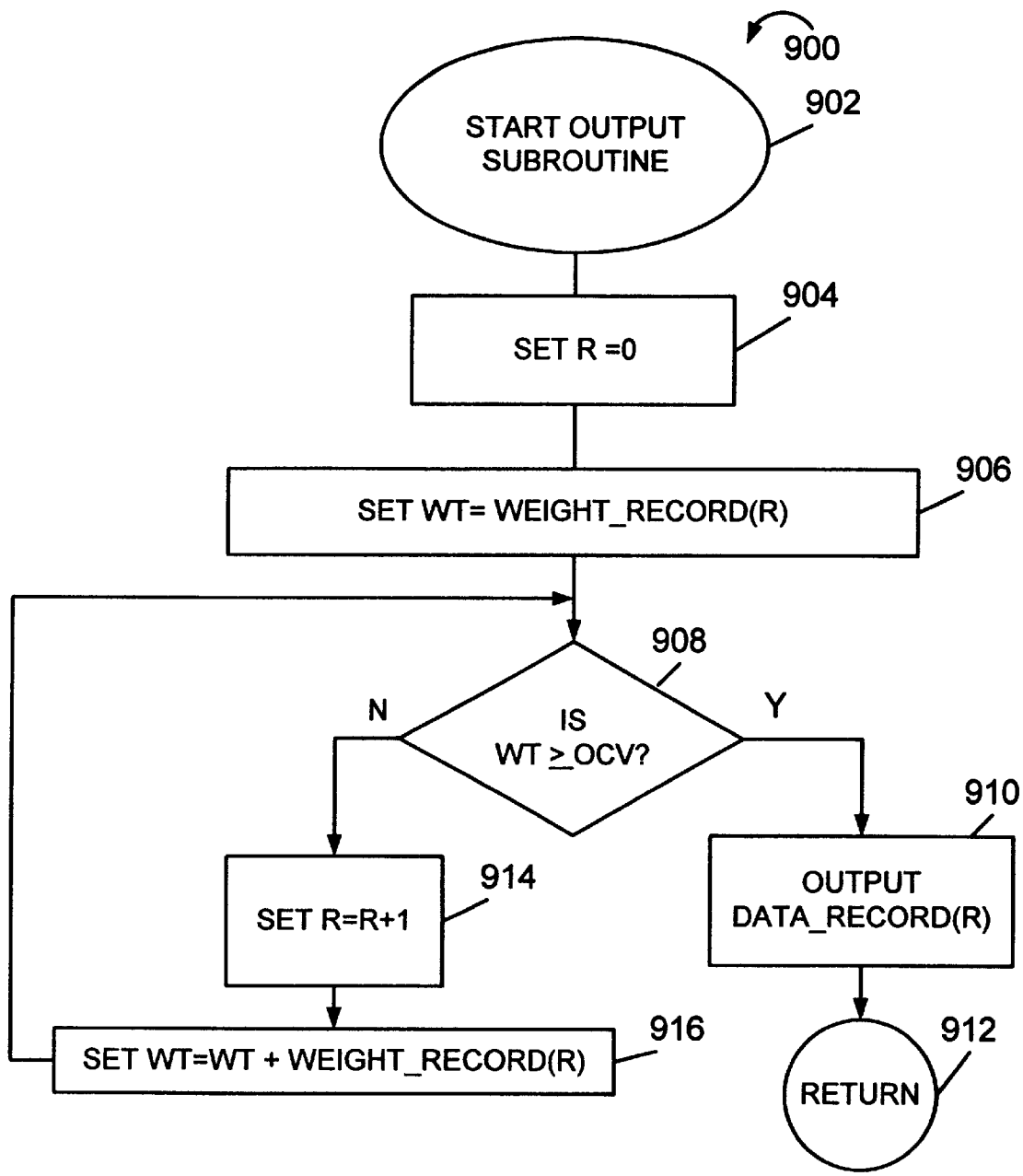
FIG. 9 illustrates an output subroutine implemented in accordance with the present invention.

The output subroutine 900 of the present invention is illustrated in FIG. 9. As illustrated, the subroutine 900 beings with the START step 902 and proceeds to step 904. In step 904, a value R, used as a register counter value, is set to 0. In step 906, a weight value, WT, representing the weight total of all the registers reviewed for possible use as the source of the filter output value is set to the weight of the record stored in register (0).

In step 908 a determination is made as to whether or not the weight total WT equals or exceeds the output control value OCV. If, in step 908, it is determined that this output criterion is not satisfied, operation proceeds from step 908 to step 914. In step 914, the register counter value R is incremented by 1. The value WT is then incremented by summing the existing weight total with the weight value included in the record stored in register R. Thus, the value WT represents a running total of the weights found in the registers considered for possible output as the median filter output value.

From step 916 operation proceeds once again to step 908 wherein the output criterion is re-evaluated. In the FIG. 9 embodiment, steps 914, 916, 908 will be repeated until the output criterion are satisfied.

When, in step 908, it is determine that the output criterion is satisfied, operation proceeds to step 910 wherein the data value stored in the record of register value R is output as the value generated by the weighted median filter routine. Once the median data value is output, program operation returns in step 912 to the point in the main filter routine where the output subroutine was called.

Figure 2:
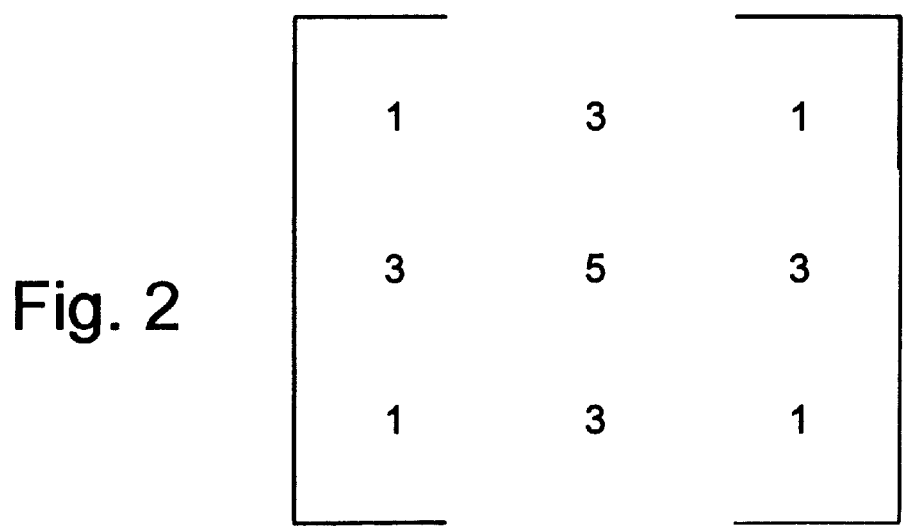
FIG. 2 illustrates a weighting matrix comprising a 3×3 set of weights to be used in an exemplary weighted median filtering operation.

FIG. 11 illustrates an array of 9 resisters into which the (data value, weight) pairs (30, 1), (25, 3), (21, 3), (19, 3), (17, 5), (13,3), (10, 1), (7, 3) and (2, 1) have been loaded. Assuming that the OCV=11, the output condition will be satisfied in step 908 when R=4 and WT=15. Thus, the data value stored in record 4 will be output as the result of the median filter routine of the present invention when a weighting matrix of the type illustrated in FIG. 2 is used.

What is claimed is:

1. An apparatus for performing a weighted filtering operation on a plurality of data values, wherein the sum of the weights used in the filtering operation equals N, the apparatus comprising:
   a replicater circuit for replicating at least one of said data values as a function of a filter weight value;
   an array of at least N storage devices, one of the N storage devices being a median storage device, each one of the N storage devices including sufficient memory to store one data value;
   means for storing one data value used to perform the filtering operation in each one of the N storage devices, said means for storing being coupled to said replicator circuit and to said array; and
   an output control circuit coupled to the array of storage devices for outputting the contents of the median storage device after a data value has been stored in each one of the N storage devices.

2. The apparatus of claim 1, wherein said means for storing includes:
   means for sorting data values so that they are stored in the array of at least N storage devices in a preselected order.

3. The apparatus of claim 2, wherein the preselected order is from smallest to largest data values.

4. The apparatus of claim 3, wherein the preselected order is from largest to smallest data values.

5. The apparatus of claim 2,
   further comprising, means for storing weighting matrix information used in determining how many times to replicate at least one of the input data values.

6. An apparatus for performing a weighted filtering operation using a plurality of input data values, the apparatus comprising:
   a data record generator for receiving the plurality of input data values and generating a data record for each of the input data values, each data record including one of the input data values and a weight value associated with the input data value;
   an array of storage devices for storing the data records generated by the data record generator; and
   an output selection circuit coupled to the array of data storage devices, for selecting for output, based on the weight values included in the data records stored in the array, a data value included in one of the data records stored in said array.

7. The apparatus of claim 6, wherein the output selection circuit includes means for summing weight values, and for comparing the summed weight values to an output control value.

8. The apparatus of claim 7, further comprising:
   a weight updating circuit coupled to the array of data storage devices for updating the weight value included in at least one of the data records stored in the data storage array after a filtering operation is performed.

9. The apparatus of claim 7, wherein the ratio of the number of data items used to perform the weighted filtering operation to the number of storage locations included in the array of data storage devices is approximately 1:1.

10. The apparatus of claim 9, wherein the array of data storage devices is an array of registers, each register providing a single storage location capable of storing one data record.

11. The apparatus of claim 6, wherein each data record further includes an age indicator value, the apparatus further comprising:

an age indicator generation circuit coupled to the data record generator circuit for generating an age indicator value used in at least one of the data records.

12. The apparatus of claim 11, wherein the age indicator generation circuit is a counter.

13. The apparatus of claim 11, wherein the output selection circuit includes means for summing weight values, and for comparing the summed weight values to an output control value.

14. The apparatus of claim 13, wherein the array of data storage devices includes a number of storage locations, the number of storage locations being directly proportional to the number of data items used to perform the weighted filtering operation.

15. The apparatus of claim 6, wherein each data record further includes an new indicator value, capable of indicating whether the contents of a data record are new or old, the data record generator including means for setting the new indicator value to indicate that the generated data records are new.

16. The apparatus of claim 6, further comprising:
a weight updating circuit coupled to the array of data storage devices for updating the weight value included in at least one of the stored data records, after a filtering operation is performed.

17. A method of performing a weighted filtering operation, comprising the steps of:
associating a weight value with each of a plurality of input data values;
sorting, according to numerical value, the input data values;
performing an output selection operation to select one of the input data values, as a function of the weight values associated with each of the plurality of input data values; and
outputting the selected one of the input data values.

18. The method of claim 17, wherein the step of performing an output selection operation, is also performed as a function of the order into which the input data values have been sorted.

19. The method of claim 17, further comprising the step of:
prior to performing said sorting step, generating a data record for each of the input data values, the data record including the input data value and the weight value associated therewith.

20. The method of claim 19, further comprising the step of:
following said sorting step, storing each of the data records in an array of data storage devices.

21. The method of claim 20, wherein said step of generating a data record for each of the input data values includes:
generating at least one age indicator value; and
incorporating the age indicator value into at least one data record.

22. The method of claim 21, further comprising the step of:
following performing an output selection operation, updating at least some of the weight values included in the data records stored in the array of data storage devices.

23. The method of claim 21, wherein the output selection operation includes the step of:
summing at least some of the weight values; and
comparing the sum of the weight values to an output control value.

24. The method of claim 21, further comprising the steps of:
following performing an output selection operation, incorporating a new age indicator into each of the generated data records.

25. The method of claim 21, further comprising the step of:
following performing an output selection operation, updating at least some of the weight values included in the data records stored in the array of data storage devices.

26. The method of claim 17, wherein the output selection operation includes the step of:
summing at least some of the weight values; and
comparing the sum of the weight values to an output control value.

27. The method of claim 26, wherein the performed filtering operation is a weighted median filtering operation, the method further comprising the step of:
prior to performing the output selection operation, generating the output control value as a function of the sum of all the weight values used to perform a single median filtering operation.

28. The method of claim 27, wherein the output control value is equal to the sum of all the weight values used to perform a single median filtering operation divided by two.

29. The method of claim 27, wherein the output control value is an integer value which is one greater than the sum of all the all the weight values used to perform a single median filtering operation divided by two.

30. The method of claim 27, wherein the output control value is an integer value which is one less than the sum of all the all the weight values used to perform a single median filtering operation divided by two.

31. The method of claim 27, wherein the output control value is an integer value which is approximately equal to the sum of all the weight values used to perform a single median filtering operation divided by two.

* * * * *